United States Patent [19]
Basavanhally et al.

[11] Patent Number: 5,721,797
[45] Date of Patent: Feb. 24, 1998

[54] APPARATUS AND METHOD FOR MOUNTING A LASER TO A SUBSTRATE AND ALIGNING THE LASER WITH AN OPTICAL CONDUIT

[75] Inventors: Nagesh Ramamoorthy Basavanhally, Trenton; Gerard Edmond Henein, Chatham; Charles H. Joyner, Middletown; Uziel Koren, Fair Haven, all of N.J.

[73] Assignee: Lucent Technologies Inc., Murray Hill, N.J.

[21] Appl. No.: 654,474

[22] Filed: May 28, 1996

[51] Int. Cl.⁶ .................................................... G02B 6/30
[52] U.S. Cl. ............................ 385/49; 385/89; 385/14
[58] Field of Search ............................... 385/49, 14, 46, 385/51, 65, 83, 89

[56] References Cited

U.S. PATENT DOCUMENTS

| | | | |
|---|---|---|---|
| 5,182,782 | 1/1993 | Tabasky et al. | 385/89 |
| 5,475,775 | 12/1995 | Kragl et al. | 385/49 |
| 5,548,673 | 8/1996 | Kitamura et al. | 385/49 |

OTHER PUBLICATIONS

Eugene D. Jungbluth, "Hybrid technnique couples laser array to fibers," Laser Focus World, May 1991 p. 217.
Peter Fletcher, "Inexpensive Assembly Technique Promises to Radically Cut the Cost of 1.55 µm Optical Communication Lasers", Electronic Design, Jun. 1995, pp. 32–33.

Primary Examiner—Phan T. H. Palmer

[57] ABSTRACT

A laser mounting configuration and method that enables a laser to be mounted onto a substrate in an orientation that passively aligns the laser with and adjacent optical fiber or optical waveguide. In an application with an optical fiber, a structure is formed in the substrate to retain the optical fiber at a fixed position. Ridges are formed in the substrate at a known orientation with respect to where the optical fiber is held. When the laser is applied to the substrate, the ridges on the substrate engage grooves formed on the bottom of the laser, thereby orienting the laser. In an application with an optical waveguide, a trench is formed in the substrate. The optical waveguide is formed partially within the trench so that the core of the waveguide is at the same height as the active layer of the laser when the laser lays flush on the substrate. Alignment stops are formed on the substrate at predetermined positions with respect to the waveguide. When the laser is brought into abutment with the alignment stops, the laser becomes properly aligned with the core of the optical waveguide.

27 Claims, 9 Drawing Sheets

APPARATUS AND METHOD FOR MOUNTING A LASER TO A SUBSTRATE AND ALIGNING THE LASER WITH AN OPTICAL CONDUIT

BACKGROUND OF THE INVENTION

1. Field of the Invention

The present invention relates to solid state lasers used in optoelectronic applications and techniques used to mount such lasers onto a silicon substrate. More specifically, the present invention relates to laser mounting structures and techniques that assist in aligning the laser with an optical conduit such as an optical fiber or an optical waveguide.

2. Description of the Prior Art

There are many applications in optical communications and in optoelectronics where a substrate mounted laser source must be aligned to either an optical fiber or an optical waveguide. When a laser source is aligned to an optical fiber or to an optical waveguide, the accuracy of the alignment between the laser source and the optical fiber or optical waveguide typically must be less than 1 µm. Such manufacturing tolerances are typically not achievable using conventional semiconductor assembly systems. As a result, prior to a laser source being permanently mounted, the laser source typically must be actively aligned with the optical fiber or optical waveguide. Using active alignment techniques, the light passing through the optical fiber or optical waveguide is actively monitored as the laser source and the optical fiber or optical waveguide are moved in relation to each other. Once an optimal orientation is detected, the laser source and optical fiber are set into position. Such active alignment techniques are both time consuming and labor intensive, thereby adding greatly to the overall cost of manufacturing products containing aligned laser sources.

In the field of optoelectronics, attempts have been made to reduce or eliminate the need to align laser sources with optical fibers. One such technique is described in an article by P. Fletcher, entitled *INEXPENSIVE ASSEMBLY TECHNIQUE PROMISES TO RADICALLY CUT THE COST OF 1.55 µm OPTICAL-COMMUNICATION LASERS, ELECTRONIC DESIGN*, pp. 32–33 (Jun. 26, 1995). In the Fletcher article, a technique is described where alignment stops are formed on a silicon substrate. A laser package is then applied to the silicon substrate, wherein the laser package abuts against the various alignment stops. By precisely manufacturing the alignment stops in relation to the position of where an optical fiber is to be mounted, the laser package can be laterally aligned with the optical fiber without the use of active alignment.

A disadvantage of the mounting technique described in the Fletcher article is that the various alignment stops only offer lateral alignment for the laser package. However, in addition to lateral alignment, a laser package must also be vertically aligned so that the light emitted by the laser package is at the same height as the core of the optical conduit. In the technique of the Fletcher article, the laser package is soldered to the silicon substrate. No portion of the laser package directly contacts the silicon substrate. Rather, the laser package rests upon a layer of solder that is disposed between the laser package and the silicon substrate. Consequently, the vertical position of the laser package depends upon the thickness of the layer of solder. Since the thickness of solder changes with changes in solder lot type, changes in solder temperature, changes in application force and other variables, the mounting technique described in the Fletcher article still contains a large degree of manufacturing variability.

A need therefore exists in the art for a laser mounting configuration and assembly method that enables a laser package to be applied to a substrate with both lateral alignment accuracy and vertical alignment accuracy, without the need for active alignment.

SUMMARY OF THE INVENTION

The present invention is a laser mounting configuration and method that enables a laser to be mounted onto a substrate in an orientation that passively aligns the laser with an adjacent optical fiber or optical waveguide. In an application with an optical fiber, a structure is formed in the substrate to retain the optical fiber at a fixed position. Ridges are also formed in the substrate at a known orientation with respect to where the optical fiber is to be held. A laser package is provided having grooves disposed on its bottom surface. When the laser is applied to the substrate, the ridges on the substrate engage the grooves on the laser, thereby orienting the laser package both laterally and vertically with respect to the optical fiber.

In an application with an optical waveguide a trench is formed in the substrate. The optical waveguide is then formed partially within the trench so that the core of the waveguide is at the same height as the active layer of the laser when the laser lays flush on the substrate. Alignment stops are deposited on the substrate at predetermined positions with respect to the waveguide. When the laser is brought into abutment with the alignment stops, the laser becomes properly aligned with the core of the optical waveguide. The laser extends across a portion of the trench formed in the substrate, thereby providing a region where the laser can be soldered to the substrate without change to the flush condition of the laser on the substrate.

BRIEF DESCRIPTION OF THE DRAWINGS

For a better understanding of the present invention, reference is made to the following description of two exemplary embodiments thereof, considered in conjunction with the accompanying drawings, in which.

DETAILED DESCRIPTION OF THE DRAWINGS

Although the present invention mounting configuration and method can be used in many optoelectronic applications where a laser light source is to be mounted to a substrate and aligned with some type of optical element, the present invention is especially well suited for aligning a laser with an optical fiber or an optical waveguide in an optical communications application. As such, by way of example, two different applications of the present invention are described and illustrated, wherein the present invention is used to align a laser to an optical fiber and an optical waveguide, respectively.

Figure 1:
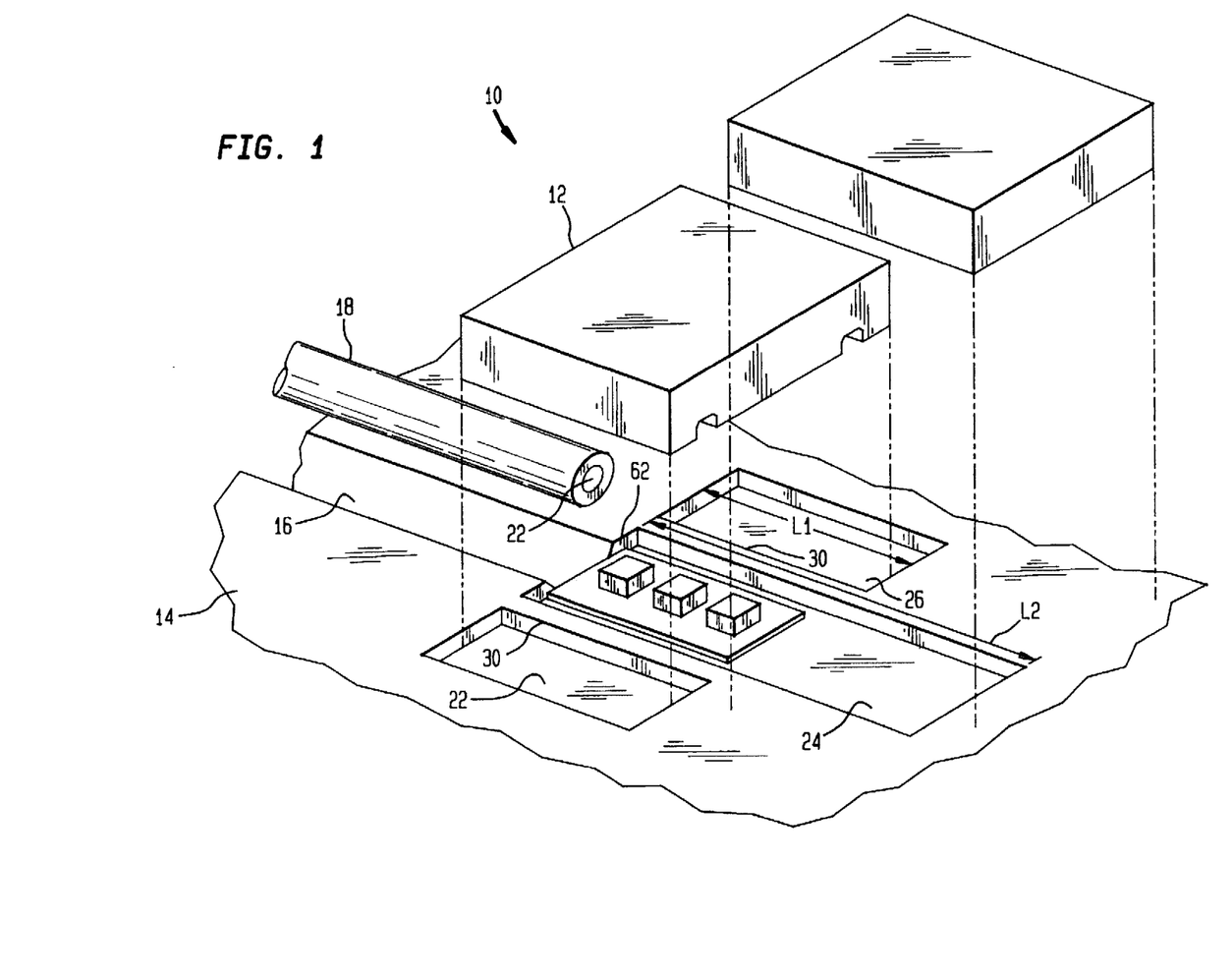
FIG. 1 is an exploded, perspective view of one preferred embodiment of a laser mounting configuration made in accordance with the present invention.

Referring to FIG. 1, a laser mounting configuration 10 is shown in accordance with the present invention for mounting a laser 12 onto a silicon substrate 14. The purpose of the overall laser mounting configuration 10 is to retain the laser 12 and an optical fiber 18 in an aligned orientation relative each other so that the light emitted by the laser 12 is automatically received by the core 20 of the optical fiber 18 without the position of either the laser 12 or the optical fiber 18 having to be actively adjusted.

A V-groove 16 is etched in a portion of the silicon substrate 14. The V-groove 16 is shaped to retain the optical fiber 18 in a fixed position where the core 20 of the optical fiber 18 is optically accessible by the laser 12. Three reliefs 22, 24, 26 are etched into the surface of the silicon substrate 14. The three reliefs 22, 24, 26 are parallel to each other and to the optical fiber V-groove 16, wherein the center relief 24 and the optical fiber V-groove 16 are collinear and share the same longitudinal center line. The two side reliefs 22, 26 have a length L1 that corresponds to the length of the laser 12. The center relief 24 has a length L2 that is longer than the two side reliefs 22, 26. The formation of the three reliefs 22, 24, 26 in the silicon substrate 14 creates two parallel ridges 30 that separate the three reliefs 22, 24, 26.

Figure 2:
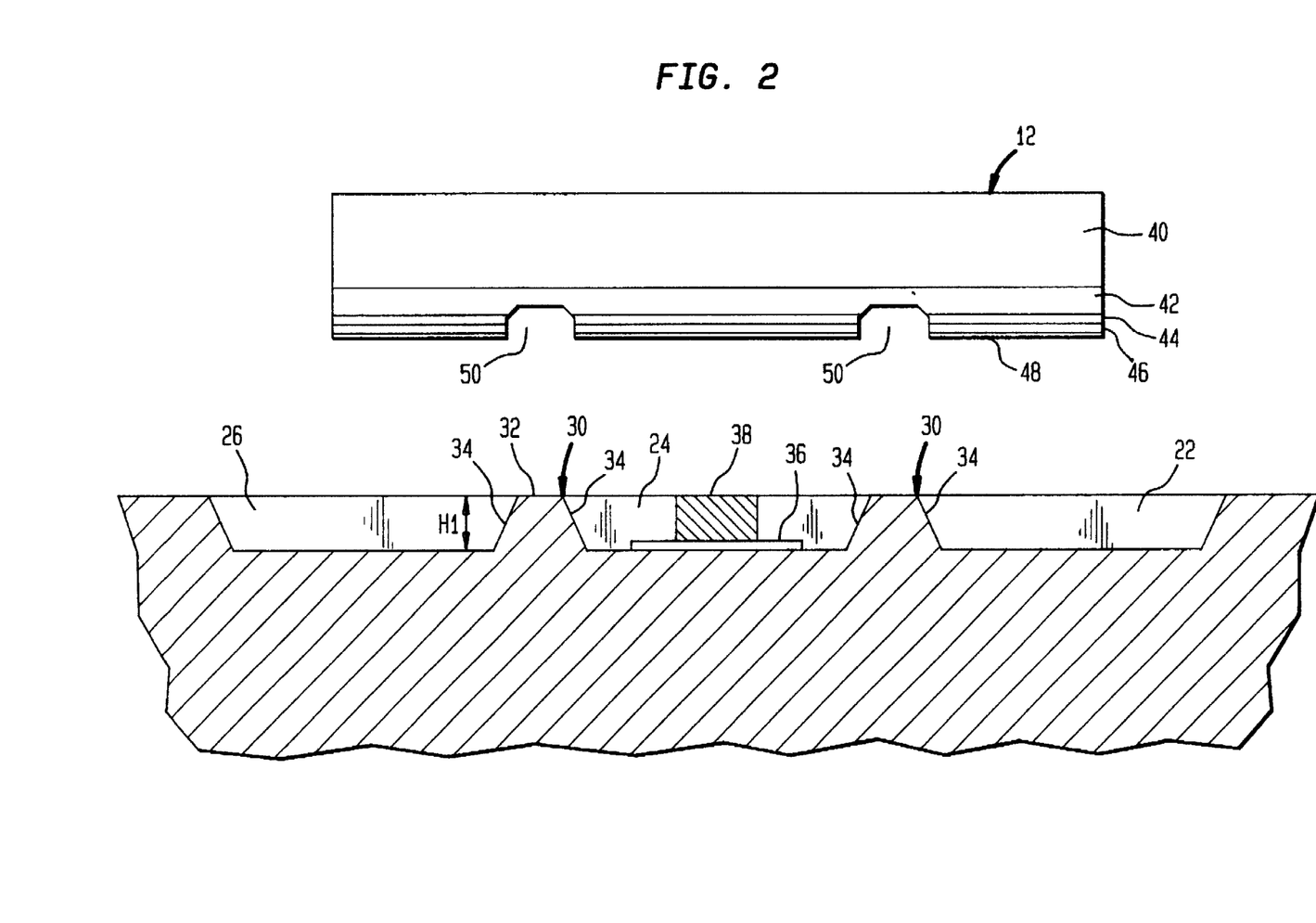
FIG. 2 is a cross-sectional view of the embodiment of FIG. 1, viewed along section line 2—2.

Referring to FIG. 2, it can be seen that the ridges 30 separating the reliefs 22, 24, 26, have trapezoidal shaped cross-sections, wherein each ridge 30 has a flat top surface 32 and two sloping side walls 34. Each ridge 30 has a height H1 that corresponds to the depth of the three reliefs 22, 24, 26 in the silicon substrate 14.

A TiPtAu bonding pad 36 is deposited at the bottom of the center relief 24. Pads of solder 38 are deposited on the top of the bonding pad 36, and are centrally positioned within the center relief 24, wherein the combined height of the pads of solder 38 on the bonding pad 36 is equal to the height H1 of the parallel ridges 30.

Figure 3:
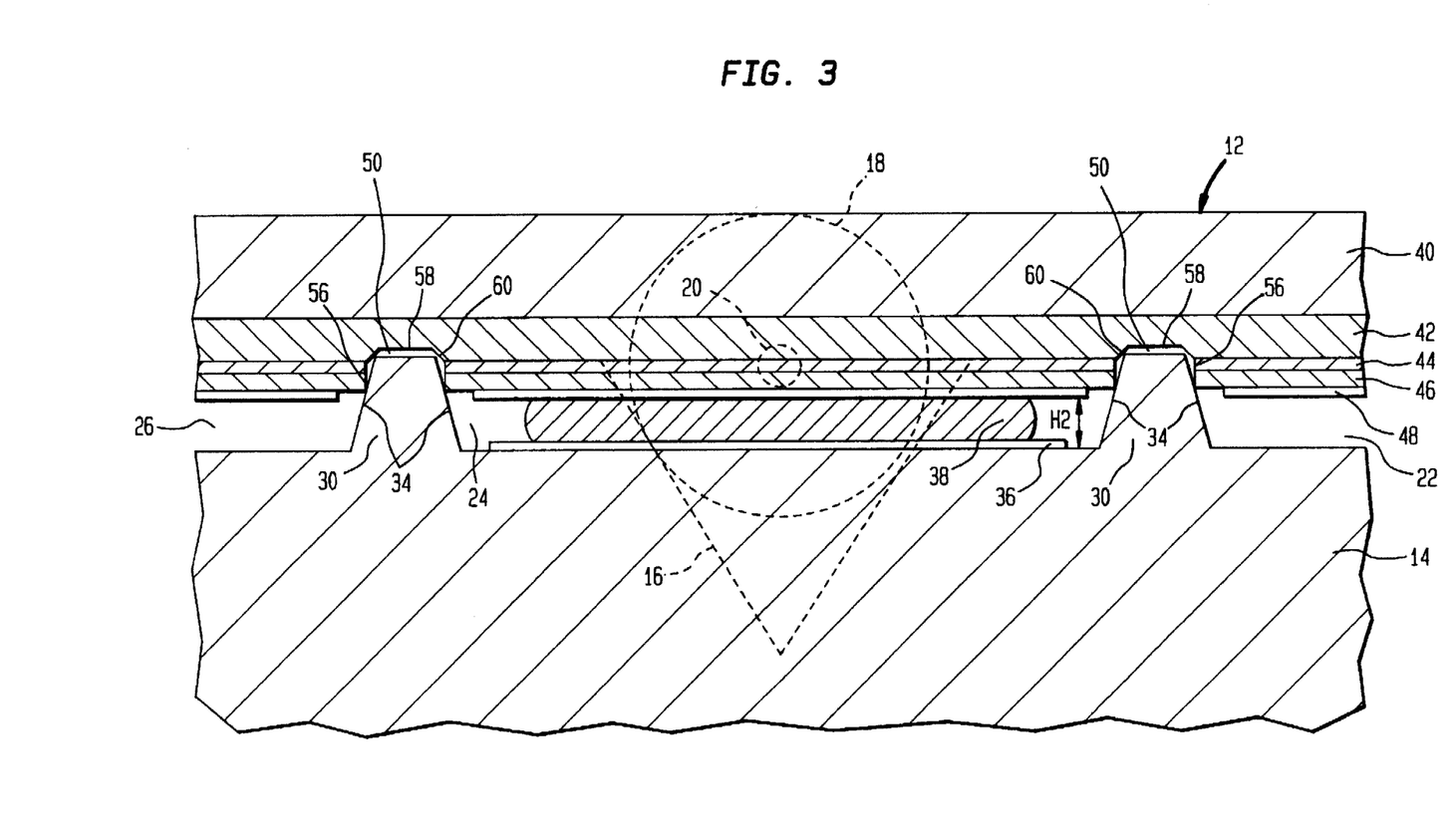
FIG. 3 is an enlarged cross-sectional view of the embodiment of FIG. 1, viewed along section line 2—2, when the laser is affixed to the silicon substrate.

Referring to FIG. 3 in conjunction with FIG. 2, it can be seen that the laser 12 is an expanded beam laser traditionally having an InP substrate 40, an InPS n-type layer 42, an active layer 44, an InPZn p-type layer 46 and a contact layer 48. The configuration of expanded beam lasers are well known in the art. However, it should be understood that the use of an expanded beam laser is merely exemplary and any other laser used in optical communications and/or optoelectronics can also be used.

Two grooves 50 are etched in the bottom of the laser 12. The grooves 50 extend through the contact layer 48, the InPZn p-type layer 46 and the active layer 44, terminating in either the InPS n-type layer 42 or the InP substrate 40. Since the grooves 50 extend through the active layer 44, it should be understood that the sections of the active layer 44 on the outside of the grooves 50 are isolated from an electrical potential applied to the active layer 44 in between the grooves 50.

Each groove 50 extends across the full length of the laser 12. Referring to FIG. 3, it can be seen that each groove 50 is defined by two vertical walls 56, a flat top surface 58 and two sloped walls 60 that extend from each vertical wall 56 to the flat top surface 58.

To assemble the laser 12 onto the silicon substrate 14, the laser 12 is first tacked onto the pads of solder 38 at a temperature well below the melting point of the solder. The temperature is then raised above the melting point of the pads of solder 38. The solder then spreads on to the bonding pad 36 and the contact layer 48, thereby bringing the laser 12 gently down onto the ridges 30. This is done to prevent any damage that can occur to the laser groove edges if during automated assembly. The laser 12 is joined to the silicon substrate 14 so that the two ridges 30 that separate the three reliefs 22, 24, 26 on the silicon substrate 14 extend into the two grooves 50 on the bottom of the laser 12. From FIG. 3, it is shown that as the laser 12 is placed onto the silicon substrate 14, the pads of solder 38 are compressed, thereby forming a solder bond between the contact layer 48 of the laser 12 and the bonding pad 36 at the bottom of the center relief 24 in the silicon substrate 14. The solder bond, including the bonding pad 36, has a height H2 which is equal to the distance between the contact layer 48 on the bottom of the laser 12 and the bottom of the center relief 24 in the silicon substrate 14.

As the ridges 30 on the silicon substrate 14 pass into the grooves 50 in the bottom of the laser 12, contact occurs between the sloping side walls 34 on the ridges 30 and the walls that define the grooves 50. The configuration of the ridges 30 on the silicon substrate 14 and the grooves 50 in the laser 12 are engineered so that the contact between the ridges 30 and grooves 50 occurs precisely when the contact layer 48 at the bottom of the laser 12 is suspended at height H2 above the bottom of the center relief 24. By retaining the laser 12 at exactly height H2 above the bottom of the center relief 24, the exact vertical position of the laser's active layer 44 can be determined with respect to the below lying silicon substrate 14. The V-groove 16 (hidden lines) disposed within the silicon substrate 14 is configured to retain an optical fiber 18 (hidden lines) so that the core 20 of the optical fiber 18 is held by the silicon substrate 14 at the same height as is the active layer 44 of the laser 12. Accordingly, the configuration of the silicon substrate 14 and the laser 12, automatically vertically aligns the laser's active layer 44 with the core 20 of the optical fiber 18, when assembled.

From FIG. 3, it can also be seen that the distance between the centers of the grooves 50 on the laser 12 is exactly the same as the distance between the centers of the ridges 30 on the silicon substrate 14. As a result, as the ridges 30 on the silicon substrate 14 pass into the grooves 50 on the laser 12, the lateral orientation along the axis that is perpendicular to the grooves 50 is known. The center of the V-groove 16 disposed within the silicon substrate 14 lays along a line in the exact middle of the ridges 30. The V-groove 16 therefore retains the optical fiber 18 at a point centered between the ridges 30 on the silicon substrate 14. Accordingly, the configuration of the silicon substrate 14, the laser 12 and the optical fiber 18 automatically aligns the center of the laser's active layer 44 with the core 20 of the optical fiber 18.

Figure 4:
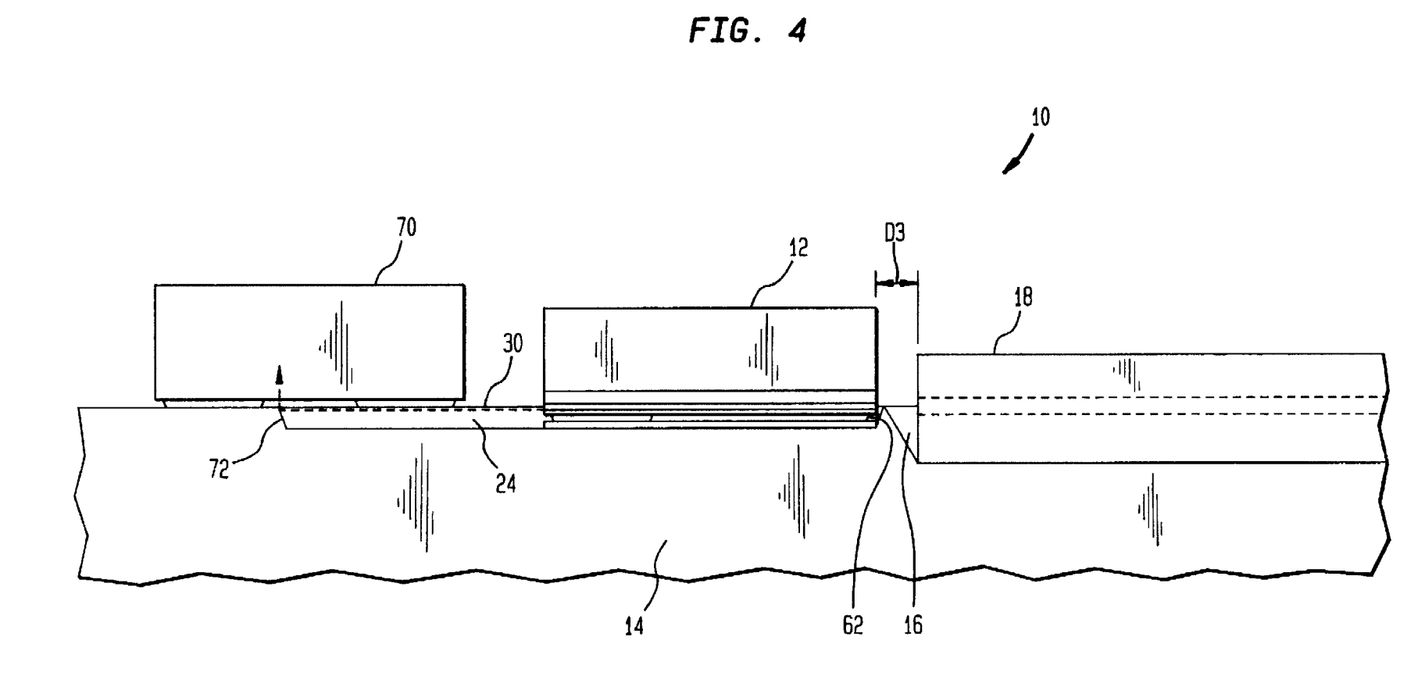
FIG. 4 is a cross sectional view of the embodiment of FIG. 1 in an assembled condition, viewed along section line 4—4.

Referring to FIG. 4 in conjunction with FIG. 1, it can be seen that the ridges 30 formed in the silicon substrate 14 terminate at the transition line 6 where the center relief 24 leads into the V-groove 16. When the laser 12 is placed on the ridges 30, the laser 12 is advanced to the transition line 62 where the ridges 30 stop. At this point the laser 12 abuts against the silicon substrate 14 at the transition line 62, wherein the configuration of the silicon substrate 14 provides an alignment stop. In FIG. 4, it can be seen that once the laser 12 abuts against the silicon substrate 14 at the transition line 62, the laser 12 is held at a distance D3 from the face surface of the optical fiber 18. Accordingly, the configuration of the silicon substrate 14 and the laser 12 automatically positions the laser 12 at a desired distance from the optical fiber 18 when the overall laser mounting configuration 10 is assembled.

In FIG. 1 and FIG. 4, a back facet monitor 70 is also shown. The back facet monitor 70 monitors the output of the laser 12 for later use in signal processing applications. As has been previously stated, the center relief 24 is longer than the laser 12. The center relief 24 terminates at an angled rear surface 72 that can be coated with a reflective material so that the rear surface 72 acts as a turning mirror. Laser light emitted from the rear of the laser 12 travels along the length of the center relief 24 and impinges upon the rear surface 72 of the center relief 24. The laser light is then reflected by the rear surface 72 up toward the back facet monitor 70. The back facet monitor 70 therein receives and detects a sample of the laser light being emitted by the laser 12.

Figure 5:
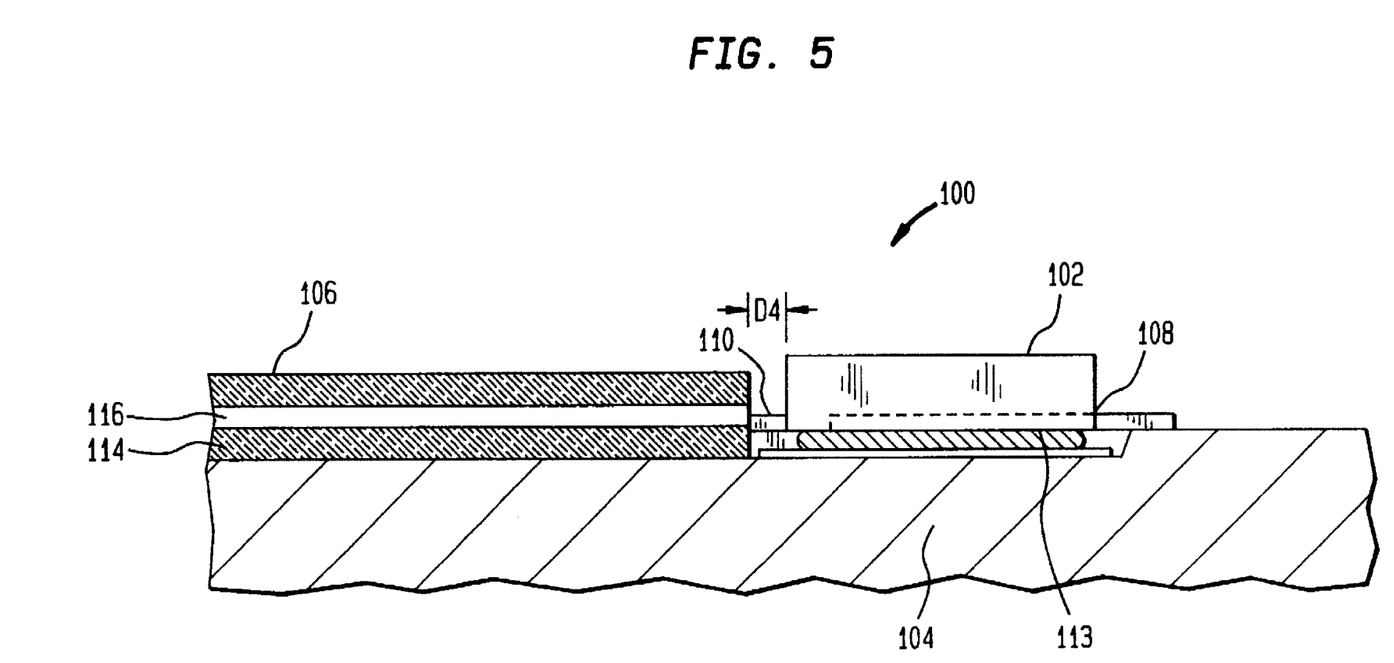
FIG. 5 is a cross-sectional view of the alternate embodiment of a laser mounting configuration shown in FIG. 9, viewed along section line 5—5.

Referring to FIG. 5, an alternate embodiment of a laser mounting configuration 100 is shown in accordance with the present invention. The laser mounting configuration 100 is used for mounting a laser 102 onto a silicon substrate 104, wherein the light from the laser 102 is directed into an optical waveguide 106 that is also formed on the silicon substrate 104. In the shown embodiment, alignment stops 108, 110 are used to laterally align the laser 102, wherein the alignment stops 108, 110 abut against at least two sides of the laser 102 and orient the laser 102 in a known location on the silicon substrate 104.

Figure 6:
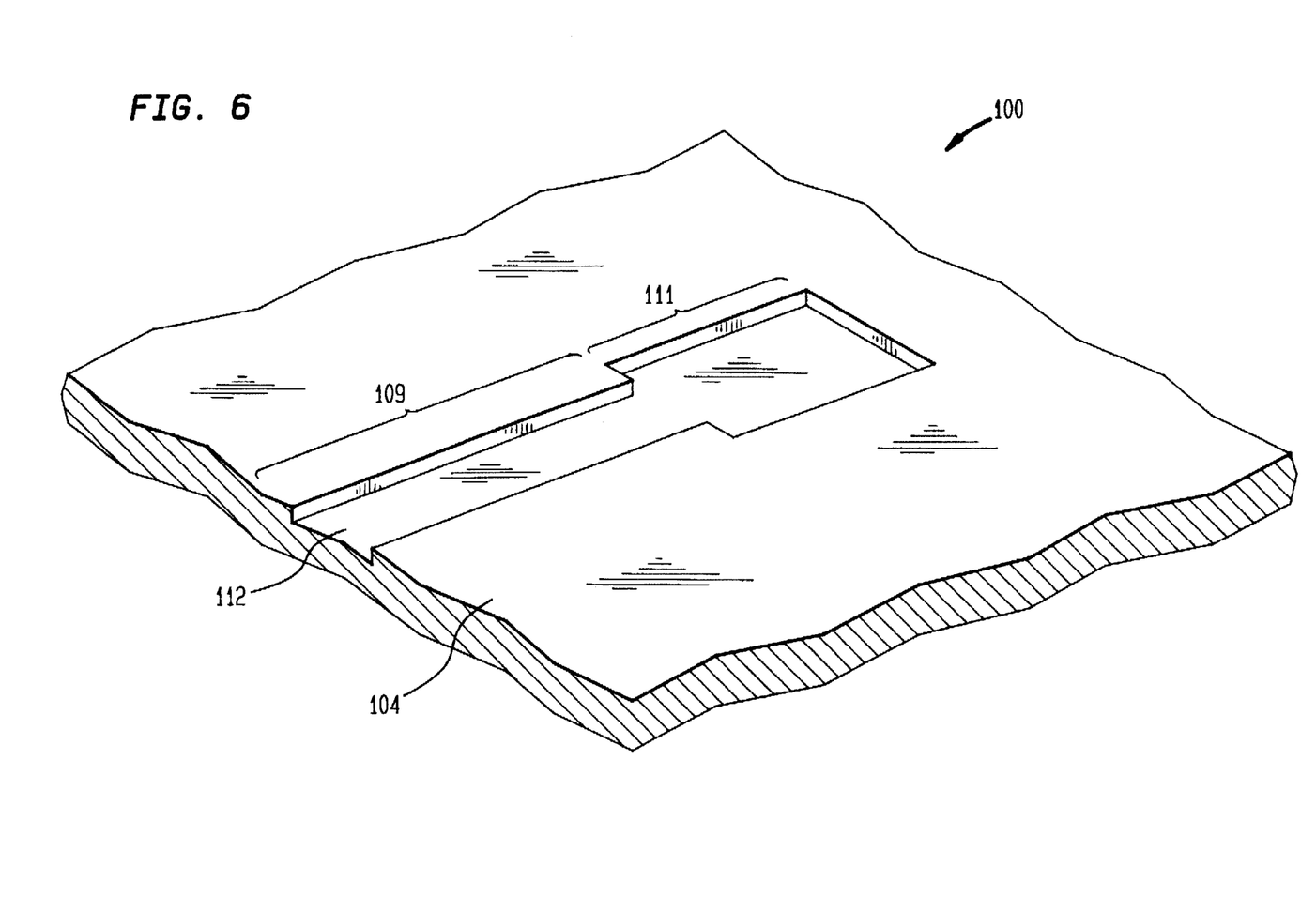
FIG. 6 is a perspective view of the substrate used in the embodiment of FIG. 5, thereby illustrating the initial manufacturing steps used to produce the configuration of FIG. 5.

Referring to FIG. 6, it can be seen that to form the laser mounting configuration 100, a trench 112 is first etched into the base silicon substrate 104. The path of the trench 112 is selected to correspond to the path of the optical waveguide the laser light will eventually follow. The trench 112 contains a first section 109 that will eventually receive an optical waveguide and a second section 111 that is designed to receive a laser, as will later be explained.

Figure 7:
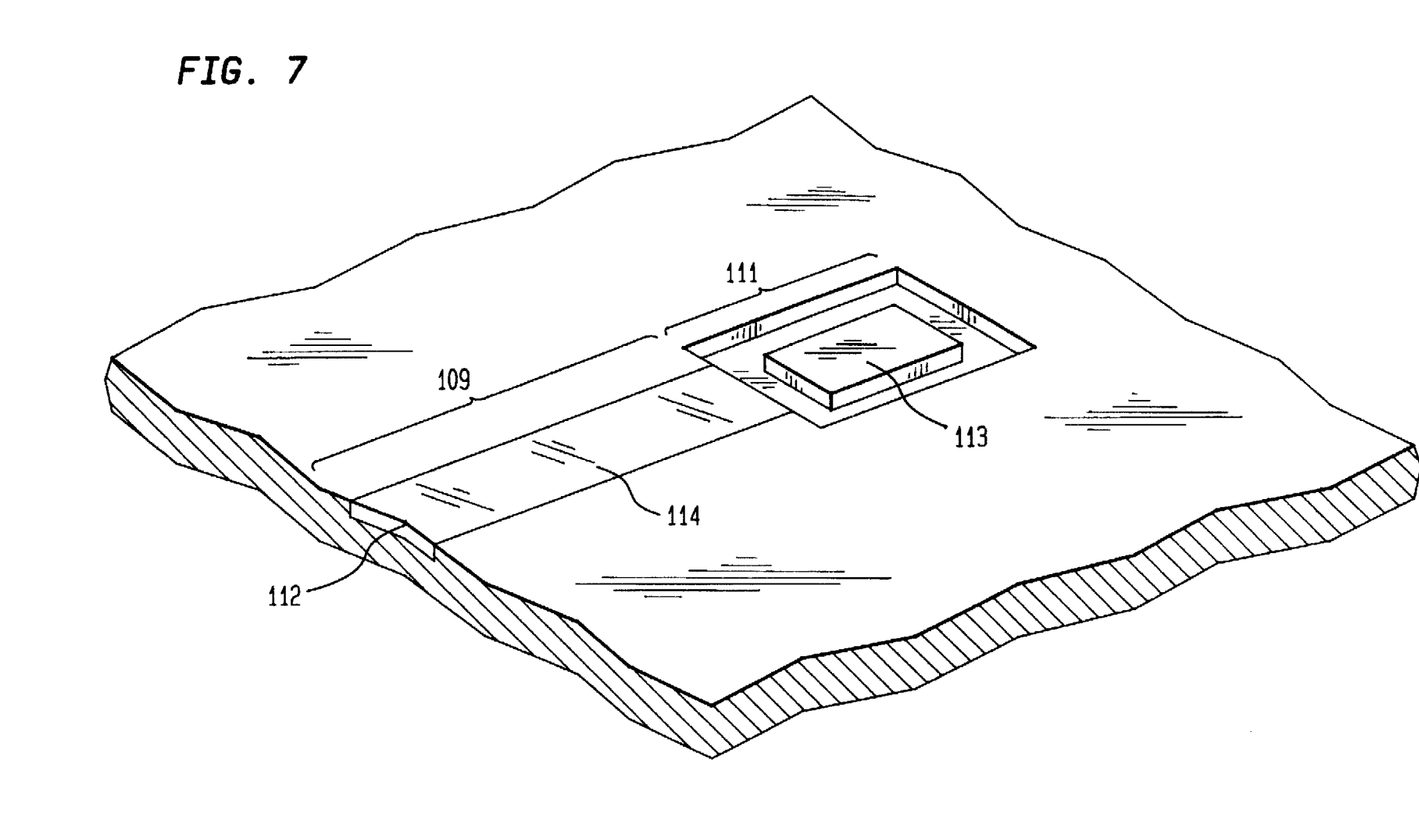
FIG. 7 is a perspective view of the substrate used in the embodiment of FIG. 5 and containing subsequent deposition layers, thereby illustrating subsequent manufacturing steps used to produce the configuration of FIG. 5.

Referring to FIG. 7, it is shown that once the trench 112 is formed, solder 114 is deposited in the second section 111 of the trench 112 where the laser is to be later mounted. The first section 109 of the trench 112 is filled with a cladding material 114 to begin the structure of an optical waveguide.

Figure 8:
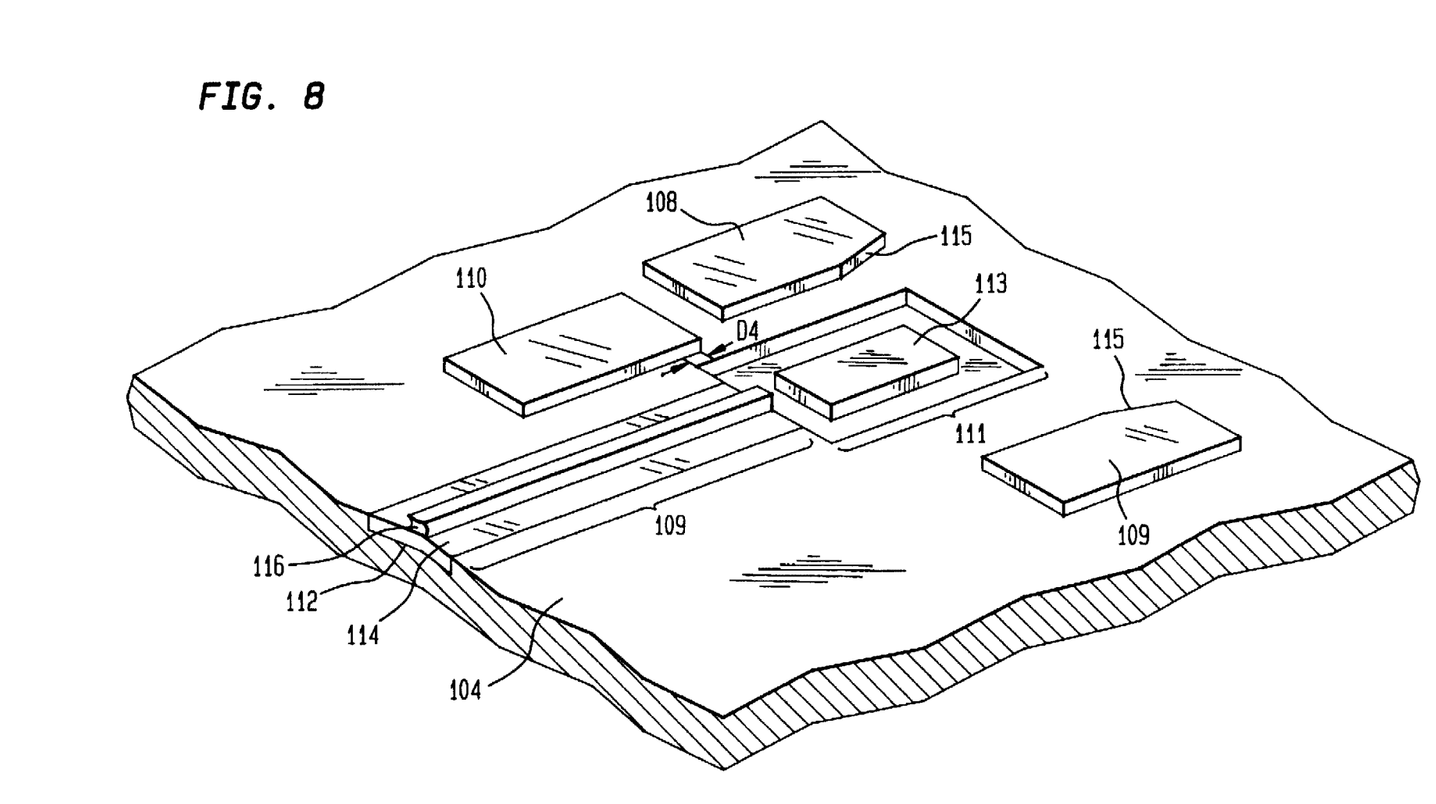
FIG. 8 is a perspective view of the substrate used in the embodiment of FIG. 5 and containing subsequent deposition layers, thereby illustrating subsequent manufacturing steps used to produce the configuration of FIG. 5.

Referring to FIG. 8, it is shown that core material is deposited on the substrate structure. A waveguide core 116 is deposited along the center of the cladding material 114, to partially complete an optical waveguide. Three alignment stops 108, 109, 110 are also formed on the silicon substrate 104 from core material. Two of the alignment stops 108, 109 are formed on either side of the second section 111 of the trench 112 that contains the solder 113. The third alignment stop 110 is formed on the side of incomplete optical waveguide, adjacent to the first section 109 of the trench 112. However, the third alignment stop 110 extends a short distance D4 beyond the end of the first section 109 of the trench 112. The waveguide core 116 and the three alignment stops are preferably etched at the same time during a single lithographic step, this is done to maintain precise relative positioning between the three alignment stops 108, 109, 110. The two side alignment stops 108, 109 are formed with tapered surfaces 115. the tapered surfaces 115 help guide the laser 102 into place during assembly.

Figure 9:
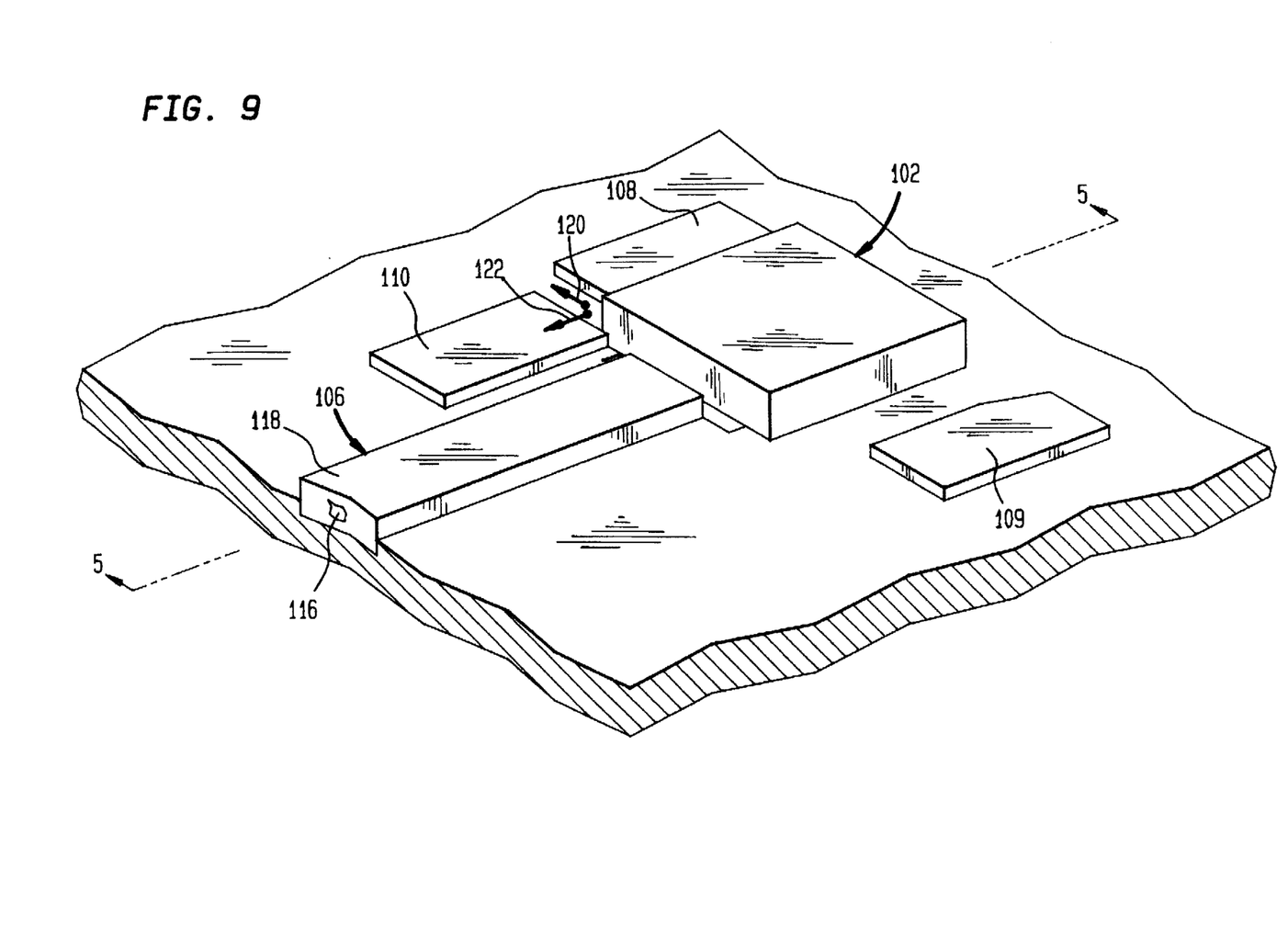
FIG. 9 is a perspective view of a completed alternate embodiment of a laser mounting configuration made in accordance with the present invention.

Referring to FIG. 9, the assembly process is completed by depositing a second cladding layer 118 over the waveguide core 116, thereby completing the optical waveguide 106.

The laser 102 is then placed over the second portion 111 (FIG. 8) of the trench 112 containing the solder 113 (FIG. 8). The laser 102 is brought into abutment with the side alignment stops 108, 109, which laterally orients the laser 102 along the axis line shown by arrow 120. The laser 102 is also brought into abutment with the third alignment stop 110, which laterally orients the laser 102 along the axis line shown by arrow 122. The edges of the laser 102 that abut against the side alignment stops 108, 109 are precisely formed with respect to the output position of the laser 102. In this manner, the positioning of the laser 102 against the three alignment stops 108, 109, 110 automatically aligns the laser output with the waveguide core 116.

Returning to FIG. 5, it is seen that laser 102 rests across the top of the etched trench 112 and is retained in position by the solder 113. The thickness T of the cladding material 114 below the waveguide core 116 is selected so that the waveguide core 116 is held at the same height as is the active layer of the laser 102. The presence of the first alignment stop 108 ensures that the center of the active layer of the laser 102 is laterally aligned with the waveguide core 116. The presence of the second alignment stop 110 ensures that the active layer of the laser 102 is positioned at distance D4 from the face of the waveguide core 116. As a result, by placing the laser 102 flush on the silicon substrate 104 and bringing the laser 102 into abutment with the three alignment stops 108, 109, 110, the laser 102 automatically becomes optically aligned with the optical waveguide 106.

It will be understood that the embodiments of the present invention described and illustrated are merely exemplary and many other embodiments can be produced using the teachings of the present invention. It should also be understood that a person skilled in the art can alter the present invention by using alternate components not specifically described. All such modifications and alternate embodiments are intended to be included in the scope of the present invention as defined by the appended claims.

What is claimed is:

1. An assembly, comprising:
   a laser having an active layer and a bottom surface disposed below said active layer;
   at least one groove extending into said laser from said bottom surface, wherein said at least one groove extends into said laser past said active layer;
   a substrate having at least one ridge disposed thereon, wherein said at least one ridge on said substrate engages at least one groove in said laser and positions said active layer of said laser along an optical path at a predetermined orientation and height with respect to said substrate.

2. The assembly according to claim 1, further including an optical conduit coupled to said substrate and disposed along said optical path, whereby light emitted by said laser passes into said optical conduit.

3. The assembly according to claim 2, wherein said optical conduit is an optical fiber having a core and said substrate further includes a structure for retaining said optical fiber in a set position whereby said core is oriented on said optical path.

4. The assembly according to claim 3, wherein said structure for retaining said optical fiber includes a V-groove that supports said optical fiber along said optical path.

5. The assembly according to claim 2, wherein said optical conduit is selected from a group consisting of an optical fiber and as optical waveguide.

6. The assembly according to claim 1, further including a solder bond disposed between said bottom surface of said laser and said substrate.

7. The assembly according to claim 1, wherein said at least one groove is configured to contain a plurality of grooves and said substrate is configured to include a corresponding plurality of ridges.

8. The assembly according to claim 1, wherein said substrate includes an alignment stop that abuts against said laser and retains said laser a predetermined distance from said optical fiber along said optical path.

9. The assembly according to claim 1, wherein said at least one groove is configured to include two grooves and said substrate is configured to include two ridges, wherein a relief, having a base surface, is defined by said substrate between said two ridges.

10. The assembly according to claim 9, wherein said two ridges support said laser a predetermined distance above said base surface of said relief, whereby said active layer of said laser is supported at a height corresponding to said optical path.

11. The assembly according to claim 1, wherein said laser emits light in a first direction along said optical path and in a second direction opposite said optical path, and said assembly further includes a light monitoring device disposed on said substrate wherein said light monitoring device receives the laser light traveling in said second direction.

12. An assembly, comprising:
a substrate having a top surface;
an optical waveguide structure deposited on said substrate, wherein said optical waveguide structure has an input end for receiving light;
a laser having a forward surface and a side surface, wherein said laser emits light from said forward surface;
at least one alignment stop deposited on said substrate wherein said at least one alignment stop optically aligns said laser with said input end of said optical waveguide structure when said forward surface and said side surface of said laser are brought into abutment with said at least one alignment stop and said laser lay flush on said top surface of said substrate.

13. The assembly according to claim 12, wherein said optical waveguide structure includes a core material surrounded by cladding material, wherein at least a portion of said optical waveguide structure extends into said trench.

14. The assembly according to claim 13, wherein said at least one alignment stop is made from the same material as is said core material of said optical waveguide structure.

15. The assembly according to claim 13, wherein said laser includes an active layer that emits light and said active layer is aligned with said core material in said optical waveguide structure when said laser lays flush on said top surface of said substrate.

16. The assembly according to claim 12, wherein a trench is disposed within said top surface of said substrate and said laser extends over at least a section of said trench on said top surface of said substrate.

17. The assembly according to claim 16, further including solder within said section of said trench, wherein said solder affixes said laser to said substrate in a manner that enables said laser to lay flush on said top surface of said substrate.

18. A method for mounting a laser onto a substrate and passively aligning the laser along a predetermined optical path, comprising the steps of:
forming grooves in the laser;
forming ridges on said substrate, wherein said grooves are sized to receive at least a portion of said ridges therein;
joining said laser to said substrate wherein said ridges on said substrate engage said grooves in said laser and align said laser along said optical path.

19. The method according to claim 18, further including the steps of:
providing an optical fiber;
forming a structure in said substrate for retaining said optical fiber and orienting said optical fiber on said optical path, whereby light emitted by said laser is received by said optical fiber.

20. The method according to claim 19, further including the step of forming an alignment stop in said substrate and bringing said laser into abutment with said alignment stop, wherein said laser is retained a predetermined distance from said optical fiber along said optical path.

21. The method according to claim 18, wherein said laser includes an active layer and said grooves formed in said laser extend through said active layer.

22. The method according to claim 18, wherein said step of joining said laser to said substrate includes soldering said laser to said substrate.

23. The method according to claim 18, further including the step of providing a device on said substrate for monitoring light emitted by said laser.

24. A method of forming an optoelectronic structure that includes a laser and an optical waveguide for directing light emitted from said laser, comprising the steps of:
providing a substrate having a top surface;
etching a trench in said substrate, through said top surface, wherein said trench follows a path selected for said optical waveguide;
forming said optical waveguide on said substrate, wherein said optical waveguide extends into a first section of said trench;
depositing at least one alignment stop on said top surface of said substrate;
positioning said laser flush on said top surface of said substrate in abutment with said at least one alignment stop, wherein said laser extends over a second section of said trench and is optically aligned with said optical waveguide.

25. The method according to claim 24, wherein said step of forming said optical waveguide on said substrate includes:
depositing a first cladding layer in said first section of said trench;
depositing core material on said first cladding layer; and
depositing a second cladding layer over said core material.

26. The method according to claim 25, wherein said step of depositing at least one alignment stop includes forming said at least one alignment stop from core material when the core material is deposited on said first cladding layer.

27. The method according to claim 24, further including the step of soldering said laser to said substrate within said second section of said trench, thereby enabling said laser to lay flush on said top surface of said substrate.

* * * * *